United States Patent Office 3,217,840
Patented Nov. 16, 1965

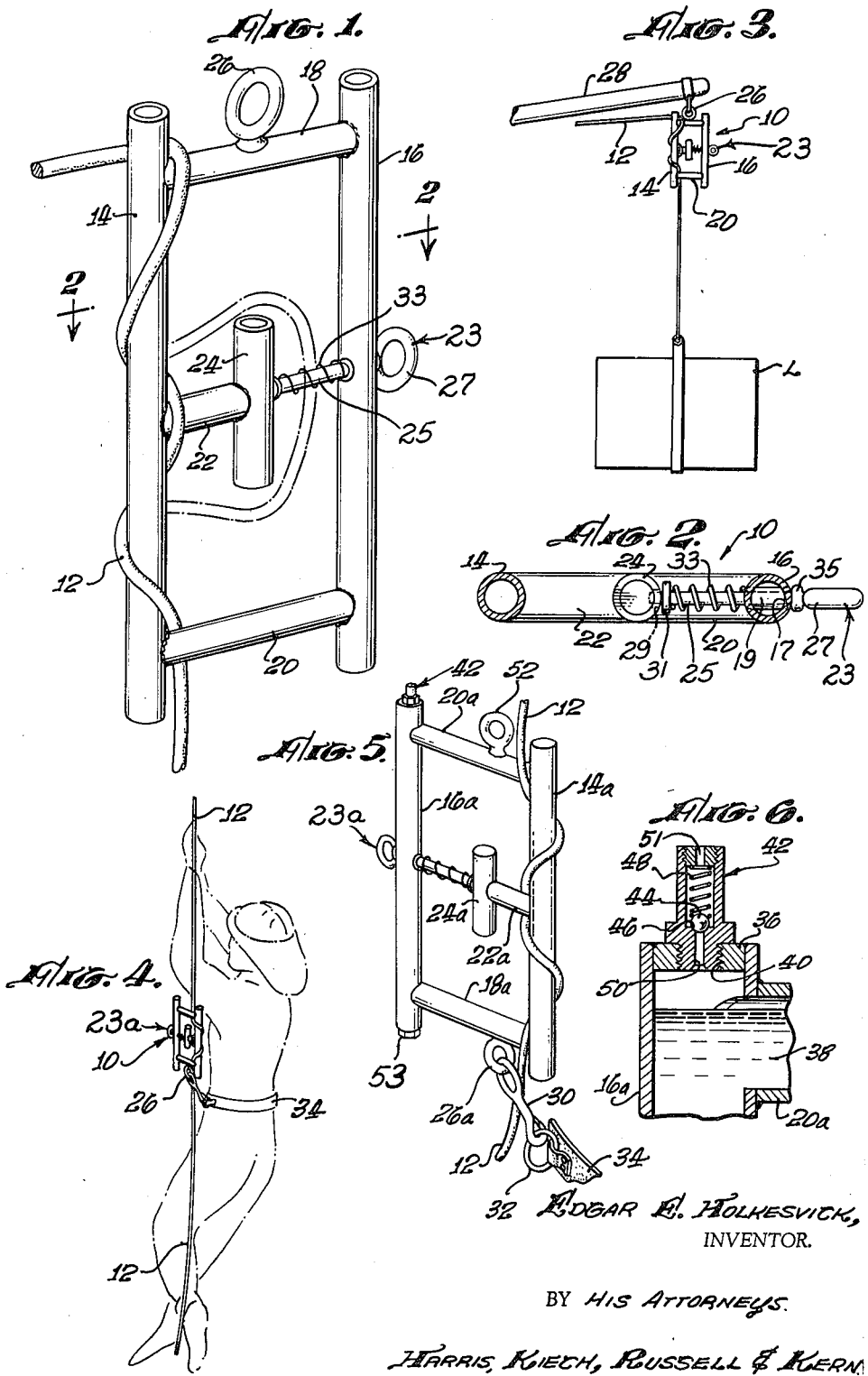

3,217,840
LOAD-HANDLING BRACKET
Edgar E. Holkesvick, Fullerton, Calif., assignor to
L. H. Himmelrich, Newport Beach, Calif.
Filed June 4, 1963, Ser. No. 285,398
11 Claims. (Cl. 188—65.4)

The present invention relates generally to the hoisting art and more particularly to a novel load-handling bracket for use in combination with a length of rope for controlling the movement of a load.

Various types of devices are in use at the present time for controlling the movements of a load, one of the most familiar of said devices being the conventional block and tackle, but most of these devices are relatively cumbersome and expensive, and often require considerable time to set up or install.

It is an object of the present invention, therefore, to provide a novel load-handling bracket which is relatively inexpensive, which is simple in construction, and easy to install and use. More particularly, it is an object to provide such a bracket which either has no moving parts or only a few such parts, and which can be manufactured from readily available material without extensive machining operations.

Another object is to provide a novel load-handling bracket which can be maintained in a stationary position or which can move with the load as the latter is being lowered.

A further object is to provide a novel load-handling bracket which can have a length of rope brought into operative engagement therewith without threading the rope therethrough. More particularly, it is an object to provide such a bracket which is so constructed that the length of rope can be easily and quickly twisted therearound and moved into an operative position by merely opening a simple safety catch (if such a safety feature is desired) and without laboriously threading the rope through the device.

Yet another object is to provide a novel load-handling bracket which can be used with ropes of various diameters. More particularly, it is an object to provide such a bracket which can be used with ropes of any diameter, from a rope having an extremely small diameter up to a rope having a diameter of three-fourths inch or even greater.

An additional object is to provide a novel load-handling bracket which can be used as an escape device for firemen and the like who may have to descend from a structure under emergency conditions. More particularly, it is an object to provide such a bracket which can be carried by the firemen or other workmen, fastened to their belts, and which can be easily and quickly affixed to a depending rope which the firemen or other workmen can then descend at a controlled rate of speed.

Because a device of the type referred to hereinabove is in sliding frictional engagement with a rope during the usage thereof and thereby generates an appreciable amount of heat, it is another object of the present invention to provide means for automatically limiting the maximum operating temperature of the device to prevent the rope from being burned, and to prevent a fireman or the like who may be using the device from being injured. More particularly, it is an object to provide such a device which includes means for absorbing or dissipating the heat so that the operating temperature of the bracket will be maintained at a safe level.

Further objects and advantages of the present invention will be apparent from the following detailed description, reference being had to the accompanying drawing wherein a preferred embodiment of the present invention is shown.

Briefly stated, one embodiment of the present invention which fulfills all of the aforementioned objects includes an elongated body portion having a cylindrical outer surface. A retaining portion, preferably of T-shape, extends laterally from the body portion adjacent the center thereof. Additional means extend laterally from the body portion adjacent the upper and lower ends thereof so that a length of rope can be twisted around the body portion with the center of the twisted portion looped over the retainer, without having the rope slip from the ends of the body portion. To limit the operating temperature of the bracket, the body portion and other elements may be formed from hollow members to provide a reservoir or chamber which may contain a liquid having a relatively low vaporization temperature, whereby the liquid can absorb the frictional heat and be vented as vapor to the atmosphere through a vent valve at the upper end of the device.

In the drawings:

FIG. 1 is a perspective view of a novel load-handling bracket constructed in accordance with the teachings of the present invention;

FIG. 2 is a cross-sectional view taken on the line 2—2 in FIG. 1;

FIG. 3 is a side elevational view showing a load-handling bracket fastened to a support for use in lowering a load;

FIG. 4 is a perspective view of a fireman using the load-handling bracket to control his rate of descent down an escape rope;

FIG. 5 is a perspective view of a modified bracket construction which includes a liquid reservoir and a vent valve for maintaining the temperature of the device below a predetermined level; and FIG. 6 is an enlarged, fragmentary vertical sectional view of the vent valve shown in the upper, left-hand corner of FIG. 5.

Referring to the drawing more particularly by reference numerals, 10 indicates generally a novel load-handling bracket embodying the teachings of the present invention and used in combination with a length of rope 12.

In the preferred embodiment the bracket 10 is rectangular in configuration with opposed elongated side members 14 and 16, and elongated top and bottom members 18 and 20, respectively, each of said members having a relatively smooth cylindrical outer surface. The aforementioned members can all be tubular in form, as illustrated, in order to minimize the weight of the device, but this is not necessary from a functional standpoint. Also, the one side member 16 and the portions of the top and bottom members spaced from the side member 14 do not necessarily have to contain a cylindrical outer surface but it is convenient to do so in order to have all of the members of similar shape.

Projecting inwardly from the side member 14 adjacent the center thereof is a T-shaped retainer which includes a body portion 22 and an end portion 24, the body portion 22 also having a relatively smooth cylindrical outer surface and being joined to the side member 14 in a manner to provide a joint which is devoid of sharp ridges or edges which may tend to wear or cut the rope 12.

If a safety feature is desired, an opening 17 (FIG. 2) can be provided in the side member 16 in axial alignment with the body portion 22 of the T-shaped retainer. Press-fitted in the opening 17 is a sleeve member 19 which supports a safety catch 23 which includes a shaft portion 25 slidably positioned in said sleeve. A ring-like handle portion 27 is provided at the outer end of the shaft portion and the inner or free end of the shaft is adapted to be received in an aperture or socket 29 provided in the end portion 24 of the retainer.

A disc-like retainer 31 is provided on the shaft portion 25 adjacent the free end thereof and a coiled spring 33 is positioned about said shaft portion between the retainer 31 and the side member 16. If desired, a stop portion 35 can be provided adjacent the handle 27 to space it from the side member 16.

A ring member 26 is fastened to one end of the device, as to the top member 18, approximately midway between the side members 14 and 16.

To use the bracket in controlling the descent of a load L (FIG. 3) the bracket 10 is suspended from a support, e.g. a boom 28, by means of the ring member 26, and one end of the rope is connected to the load L which is temporarily supported by means not shown, e.g. a window below the roof from which the boom extends.

The safety catch 23 (if one is used) is moved to the open or retracted position by grasping the handle portion 27 and moving the free end of the shaft portion 25 against the holding action of the spring 33 to a position where said free end is spaced away from the end portion 24 of the retainer a distance greater than the thickness of the rope being used. A portion of the rop 12 is then wrapped or twisted around the side member 14 a predetermined number of times, as shown in FIG. 1, with the bight or center portion of the twisted rope passing over the end portion 24 of the retainer. Thereafter the safety catch 23 is released whereby the free end of the shaft portion 25 is seated in the aperture 29 by the action of the spring 33. It will be noted that the end portion 24 of the retainer must be spaced from the side member 16 a sufficient distance so that the rope can pass between the retainer and the free end of the shaft portion 25 when the safety catch 23 is moved to the fully open or retracted position. Also, it will be noted that those portions of the side member 14 between the retainer and the top and bottom members 18 and 20, respectively, must be long enough to receive several turns of rope thereabout.

After the rope has been wrapped around the side member 14 a sufficient number of times to provide the desired frictional resistance, the length of rope is pulled taut so as to engage the center of the twisted portion with the body portion 22 of the retainer. Here again, the length of the body portion 22 must be greater than the diameter of the rope 12 being used.

When the load L is moved from the temporary support, the rope 12 will slide through the bracket, i.e. around the side member 14 and the body portion 22 of the retainer, at a rate which is determined primarily by the weight of the load, the coefficient of friction between the rope and the side member 14, and the length of the rope in sliding engagement with the bracket 10. The cylindrical outer surfaces of the side member 14, the top and bottom members 18 and 20, and the body portion 22 of the retainer permit the rope 12 to slide smoothly through the bracket with a substantially constant amount of frictional drag and without causing any abnormal pressure on any particular portion of the rope, as would tend to increase the wear thereof.

It will be readily apparent that a bracket 10 of this construction can be used with practically any size of rope. Thus, by merely increasing the length of the various members, a bracket can be constructed to accommodate rope of any maximum diameter as well as any minimum diameter, but, from a practical standpoint, it has been determined that a three-fourths inch rope is about the maximum size which will be used with this type of device. It should also be noted that the side member 16 is included in the construction primarily for reasons of strength and for joining together the top and bottom members 18 and 20 and does not affect the operation of the device or the rate of speed at which the load L descends. Furthermore, the ring 26 is placed relatively close to the side member 14 so that the latter will remain in substantially a vertical position during the operation of the device.

The rope is preferably of braided construction to prevent the load from rotating during its descent and the fibers of the rope should be made from a synthetic material such as nylon so as to be resistant to heat.

If the bracket 10 is to be used as an escape device, it is provided with a releasable catch 30 which can engage a ring 32 carried on a belt 34 (FIGS. 4 and 5) worn by the fireman or other user of the device.

In the usual situation where it is anticipated that it may be necessary to leave a building or other structure under emergency conditions, one or more ropes would be suspended from the top of the structure in alignment with the windows. Thus, when a fireman or the like carrying a bracket 10 on his belt 34 desires to descend one of said ropes, he merely reaches through the window, grasps a loose section of the hope and wraps it around the side member 14 with the center of the loose portion passing over the retainer as previously described and as shown in FIG. 1. He can then pull the rope taut so as to bring the center portion in engagement with the retainer and then step out of the window and descend the rope 12 at a rate of speed which is primarily dependent upon his weight and the number of turns of the rope around the side member 14 of the bracket. As a practical matter, the fireman or structural worker using the bracket would ascertain the number of turns of rope required to descend at a relatively fast rate of speed, based on a trial-and-error approach, and thereafter use that same number of turns each time regardless of the speed of descent desired. Thus, if the person using the device wished to descend at a relatively fast rate of speed, he would rely solely on the bracket for controlling his rate of descent. On the other hand, if he desired to descend at at slower rate of speed, he would merely have to grasp the slack portion of the rope 12 below the bracket 10 so as to apply an increased amount of frictional resistance.

Because the sliding frictional engagement of the rope 12 with the surfaces of the bracket 10 may produce an appreciable amount of heat during usage, as when the device is continuously reused to lower loads from a building during a moving operation (FIG. 3) or when the distance descended may be relatively great (FIG. 4), it may be advantageous in such instances to provide means for automatically maintaining the surface temperature of the bracket below a predetermined safe level.

Thus, referring to FIGS. 5 and 6 which show a modified construction wherein like parts bear the same number as in FIGS. 1 through 4 except that the letter a has been added thereto, the numbers 14a, 16a, 18a, 20a, 22a, and 24a are made from heat-conducting tubular material with the ends thereof sealed off as with disc-like inserts 36 (FIG. 6) to provide a reservoir 38 within the interior of the bracket.

The insert 36 at the end of the side member 16a which is opposite to the ring member 26a is provided with an internally threaded opening 40 which removably receives a vent valve member 42 (FIG. 6). The valve member 42 includes a ball valve 44 which is urged into engagement with a valve seat 46 by a spring 48 to seal off a passageway 50 which is in communication with the reservoir 38. The upper end of the valve member 42 is provided with a vent passageway 51 so that vapor produced within the reservoir 38 can flow past the unseated ball valve 44 and be exhausted to the atmosphere.

In use, the valve member 42 is removed and the reservoir 38 is filled with a liquid which has a relatively low vaporization temperature, i.e. preferably below the vaporization temperature of water and closer to about 115° F. Various types of alcohols are available which have a vaporization temperature within the aforementioned range and which will operate satisfactorily in the device.

After the valve member 42 is replaced and the bracket placed in operation with the rope 12 sliding over its surfaces in frictional engagement therewith (FIG. 5), the heat which is produced in the side member 14a, for example, is conducted to the liquid in the reservoir 38 so as to gradually increase the temperature thereof and thereby prevent the temperature of the members over which the rope is sliding from increasing too rapidly. When the temperature of the liquid reaches the vaporization point, any further increase in temperature causes the liquid to vaporize and thereby absorb the frictional heat as heat vaporization, with the pressure produced by the vapor overcoming the force of the spring 48 so as to unseat the ball valve 44 and permit the vapor to pass to the atmosphere, thereby maintaining the vaporization temperature of the liquid at approximately the same level.

In this manner, the surface temperature of the members over which the rope slides is maintained fairly close to the vaporization temperature of the liquid, i.e. so long as any liquid remains in the reservoir. As indicated above, the vaporization temperature of the liquid which is used should be low enough so that the surface temperature of the bracket does not become so hot as to cause it to burn the rope 12 or the person using the device, but the vaporization temperature should not be so low as to cause the liquid to be vaporized by the ambient temperature and thereby pass off as vapor even before the device is placed in use.

It will be noted that the valve member 42 is placed in the side member 16a which is farthest from the user's face (FIGS. 4 and 5) so that vapor escaping therefrom will cause the least amount of discomfort, and, if desirable, a deflector (not shown) may be mounted on the member 20a to deflect the vapor away from the user's face. As an alternative construction, the valve member 42 can be mounted in the side of the member 16a at a point which is opposite the end of the member 20a so as to vent the vapor in a direction away from the user.

As shown in FIGS. 4 and 5, the ring member 26 (or 26a) is at the lower end of the bracket when it is used as an escape device. However, when the bracket is used to lower loads (FIGS. 1 and 3), the ring member 26 is at the upper end of the bracket.

Accordingly, because it is necessary to always have the vent valve 42 at the upper end of the side member 16a when the liquid-cooled embodiment is used, it is advisable to provide another ring member 52 (FIG. 5) on the member 20a so that the bracket can be used either as an escape device or for lowering loads, as previously described. This same result could also be achieved by using a removable solid plug 53 in the lower end of member 16a (FIG. 5) so that it could be interchanged with the vent valve 42 depending on whether the bracket is used as an escape device or to lower loads, but it is obviously more economical and convenient to use two separate ring members.

Thus, it is apparent that there has been provided a novel load-handling bracket and escape device which fulfills all of the objects and advantages sought therefor. The device is extremely simple in design and relatively inexpensive to manufacture. It can be made without any moving parts if the safety catch is omitted and with or without the safety catch it can accommodate any size of rope, from the smallest up through and beyond a three-fourths inch rope, and where advisable, it can be liquid-cooled to prevent the surface temperature thereof from reaching the point where it would burn the rope or injure the user.

It is to be understod that the foregoing description and the accompanying drawing have been given only by way of illustration and example and that changes and alterations in the present disclosure which will be readily apparent to one skilled in the art are contemplated as within the scope of the present invention.

I claim:

1. A load-handling bracket, comprising:
   elongated first and second side members and top and bottom members connected together in a rectangular configuration,
   said side members each being of a length to receive a length of rope twisted therearound,
   the first side member and the portions of the top and bottom members adjacent the first side member having relatively smooth, cylindrical outer surfaces to receive said rope twisted around said first side member;
   means on said top member for suspending the bracket from a support; and
   a T-shaped retaining member having a body portion and an end portion extending laterally from the first side member toward the second side member adjacent the center of the first side member,
   said body portion having a relatively smooth cylindrical outer surface and the end portion being spaced from the second side member a distance greater than the thickness of the rope twisted around the first side member.

2. The combination of:
   an elongated body member having a relatively smooth, curved outer surface and upper and lower ends;
   means for suspending the body member from a support;
   a retaining member extending laterally from the body member adjacent the center thereof,
   the outer surface of the retaining member adjacent the body member having a relatively smooth, curved outer surface;
   a length of rope twisted around the body member with the center portion of the twisted rope looped over the retaining member; and
   means adjacent the top and the bottom of the body member preventing the twisted rope from slipping from the ends thereof.

3. The combination of:
   elongated first and second side members and top and bottom members connected together in a rectangular configuration to form a bracket,
   the first side member and the portions of the top and bottom members adjacent the first side member having relatively smooth, cylindrical outer surfaces;
   means on said top member for suspending the bracket from a support;
   a T-shaped retaining member having a body portion and an end portion extending laterally from the first side member toward the second side member adjacent the center of the first side member,
   said body portion having a relatively smooth, cylindrical outer surface; and
   a length of rope twisted around the first side member with the center portion of the twisted rope looped over the retaining member,
   the end portion of the retaining member being spaced from the second side member a distance greater than the thickness of the rope.

4. A load-handling bracket for a sliding frictional engagement with a length of rope, comprising:
   an elongated body member of heat-conducting material having a relatively smooth outer surface with upper and lower ends and being of a length to receive the length of rope twisted therearound;
   attachment means adjacent one end of the body member;
   a retaining member extending laterally from the body member adjacent the center thereof,
   the outer surface of the retaining member adjacent the body member having a relatively smooth outer surface;
   means adjacent the top and bottom of the body members preventing a rope twisted therearound from slipping from the ends thereof;
   an elongated cavity in the body member adapted to receive a volume of liquid having a predetermined vaporization temperature;

an aperture in the body member adjacent the upper end thereof in communication with said cavity; and a normally closed vent valve mounted in said aperture and including means for opening said valve and placing said cavity in communication with the atmosphere when the vapor within the cavity attains a predetermined pressure.

5. A load-handling bracket for sliding frictional engagement with a length of rope, comprising:

elongated first and second side members and top and bottom members connected together in a rectangular configuration, said side members each being of a length to receive the rope twisted therearound;

the first side member and the portions of the top and bottom members adjacent thereto having relatively smooth outer surfaces;

a retaining member having an outer end extending laterally from the first side member adjacent the center thereof;

attachment means fastened adjacent one end of said first side member;

a continuous elongated cavity in said side members and top and bottom members adapted to receive a volume of liquid having a predetermined vaporization temperature;

an aperture in one of said members adjacent the upper portion of the cavity in communication therewith; and a normally closed vent valve mounted in said aperture, said valve including means for opening said valve and placing said cavity in communication with the atmosphere when the vapor within the cavity attains a predetermined pressure.

6. A load-handling bracket, comprising:

elongated first and second side members and top and bottom members connected together in a rectangular configuration, said side members each being of a length to receive a length of rope twisted therearound, the first side member and the portions of the top and bottom members adjacent the first side member having relatively smooth, cylindrical outer surfaces to receive said rope twisted around said first side member;

means on said top member adjacent the first side member for suspending the bracket from a support;

a retaining member having an outer end extending laterally from the first side member toward the second side member adjacent the center of said first side member;

the outer end of said retaining member being spaced from the second side member a distance greater than the thickness of the rope to be twisted around the first side member; and retractable barrier means for selectively bridging the space between said retaining member and the second side member to prevent the rope from passing therebeween.

7. The combination of:

elongated first and second side members and top and bottom members connected together in a rectangular configuration to form a bracket, the first side member and the portions of the top and bottom members adjacent the first side member having relatively smooth, cylindrical outer surfaces;

means on said top member for suspending the bracket from a support;

a T-shaped retaining member having a body portion and an end portion extending laterally from the first side member toward the second side member adjacent the center of the first side member, said body portion having a relatively smooth, cylindrical outer surface;

a length of rope twisted around the first side member with the center portion of the twisted rope looped over the retaining member, the end portion of the retaining member being spaced from the second side member a distance greater than the thickness of the rope; and retractable barrier means mounted on either the second side member or the retaining member and engageable with the other for selectively bridging the space therebetween to prevent the passage of the rope during the operation of the device.

8. In combination:

a load-handling bracket including an elongated body member having a relatively smooth outer surface and being of a length to receive at least two turns of rope therearound, said body member having an upper end and a lower end;

means adjacent the upper end of said body member for suspending it from a support;

a retaining member extending laterally from the body member intermediate the ends thereof, the outer surface of the retaining member adjacent the body member having a relatively smooth outer surface;

a length of rope twisted about the body member above the retaining member, thence over the retaining member, and about the body member below the retaining member; and means adjacent the top and the bottom of the body member preventing the length of rope from slipping from the ends thereof.

9. In combination:

a load-handling bracket including an elongated body member having a relatively smooth outer surface and being of a length to receive at least two turns of rope therearound, said body member having an upper end and a lower end;

means adjacent the upper end of said body member for suspending it from a support;

a retaining member extending laterally from the body member adjacent the center thereof, the outer surface of the retaining member adjacent the body member having a relatively smooth outer surface;

a length of rope twisted about the body member above the retaining member, thence over the retaining member, and about the body member below the retaining member; and means adjacent the top and the bottom of the body member preventing the length of rope from slipping from the ends thereof.

10. In combination:

a load-handling bracket including an elongated body member having a relatively smooth cylindrical outer surface and being of a length to receive at least two turns of rope therearound, said body member having an upper end and a lower end;

means adjacent the upper end of said body member for suspending it from a support;

a T-shaped retaining member with a body portion and an end portion extending laterally from the body member adjacent the center thereof, said body portion having a relatively smooth cylindrical outer surface;

a length of rope twisted about the body member above the retaining member, thence over the retaining member, and about the body member below the retaining member; and means projecting laterally from the body member adjacent the top and the bottom thereof preventing the rope from slipping from the ends of said body member.

11. In combination:
a load-handling bracket including an elongated body member having a relatively smooth outer surface and being of a length to receive at least two turns of rope therearound,
  said body member having an upper end and a lower end;
means adjacent the upper end of said body member for suspending it from a support;
a retaining member extending laterally from the body member intermediate the ends thereof;
an elongated cavity in the body member to receive a volume of liquid having a predetermined vaporization temperature;
an aperture in the body member adjacent the upper end thereof in communication with said cavity;
a normally closed vent valve in said aperture and including means for opening said valve and placing said cavity in communication with the atmosphere when the vapor within the cavity attains a predetermined pressure;
a length of rope twisted about the body member above the retaining member, thence over the retaining member, and about the body member below the retaining member; and
means adjacent the top and the bottom of the body member preventing the length of rope from slipping from the ends thereof.

References Cited by the Examiner

UNITED STATES PATENTS

| | | | |
|---|---|---|---|
| 284,431 | 9/1883 | Johnson | 188—65.3 |
| 507,455 | 10/1893 | Sansoucy | 182—191 |
| 2,372,984 | 4/1945 | Pierce | 188—264 |
| 3,022,856 | 2/1962 | Galeano | 188—65.4 X |

MILTON BUCHLER, *Primary Examiner.*

EUGENE G. BOTZ, *Examiner.*